US012243285B2

(12) United States Patent
Schönlieb-Stalzer et al.

(10) Patent No.: US 12,243,285 B2
(45) Date of Patent: Mar. 4, 2025

(54) APPARATUS FOR DETECTING A SPECULAR SURFACE IN A SCENE AND METHOD FOR CONTROLLING AN APPARATUS FOR DETECTING A SPECULAR SURFACE IN A SCENE

(71) Applicant: Infineon Technologies AG, Neubiberg (DE)

(72) Inventors: Armin Josef Schönlieb-Stalzer, Seiersberg-Pirka (AT); Sebastian Handel, Graz (AT); Hannes Plank, Graz (AT)

(73) Assignee: Infineon Technologies AG, Neubiberg (DE)

( * ) Notice: Subject to any disclaimer, the term of this patent is extended or adjusted under 35 U.S.C. 154(b) by 87 days.

(21) Appl. No.: 18/053,580

(22) Filed: Nov. 8, 2022

(65) Prior Publication Data

US 2023/0143446 A1 May 11, 2023

(30) Foreign Application Priority Data

Nov. 11, 2021 (EP) .................................. 21207802

(51) Int. Cl.
*G06V 10/60* (2022.01)
*G02B 5/30* (2006.01)
(Continued)

(52) U.S. Cl.
CPC .......... *G06V 10/60* (2022.01); *G02B 5/3025* (2013.01); *G06T 7/13* (2017.01); *G06V 10/141* (2022.01);
(Continued)

(58) Field of Classification Search
CPC .... G06V 10/60; G06V 10/141; G06V 10/761; G06V 10/764; G06T 7/13; G06T 2207/30252; G02B 5/3025
See application file for complete search history.

(56) References Cited

U.S. PATENT DOCUMENTS

| 10,781,986 | B2 * | 9/2020 | Toyooka | ................ F21S 41/135 |
| 2008/0129541 | A1 * | 6/2008 | Lu | ........................... G06V 20/56 |
| | | | | 340/905 |
| 2013/0058528 | A1 * | 3/2013 | Liu | ...................... G06V 20/588 |
| | | | | 382/103 |

FOREIGN PATENT DOCUMENTS

| WO | WO-2017053415 A1 * | 3/2017 | ......... G06K 9/00791 |
| WO | WO-2021133385 A1 * | 7/2021 | ............. G06T 7/337 |

OTHER PUBLICATIONS

Extended European Search Report for Application No. EP21207802. 6, mailed on Aug. 1, 2022, 14 Pages.

(Continued)

*Primary Examiner* — Xin Sheng
(74) *Attorney, Agent, or Firm* — Harrity & Harrity, LLP

(57) ABSTRACT

An apparatus for detecting a specular surface in a scene is provided. The apparatus includes an illumination device configured to emit polarized light towards the scene. The apparatus further includes an imaging system configured to capture a first image of the scene based on light emanating from the scene. The light emanating from the scene includes one or more reflection of the emitted polarized light. The imaging system is further configured to capture a second image of the scene based on filtered light. The apparatus further includes a polarization filter configured to generate the filtered light by filtering the light emanating from the scene. The apparatus further includes processing circuitry (Continued)

configured to determine presence of the specular surface in the scene based on a comparison of the first image and the second image.

20 Claims, 10 Drawing Sheets

(51) Int. Cl.
*G06T 7/13* (2017.01)
*G06V 10/141* (2022.01)
*G06V 10/74* (2022.01)
*G06V 10/764* (2022.01)

(52) U.S. Cl.
CPC .......... *G06V 10/761* (2022.01); *G06V 10/764* (2022.01); *G06T 2207/30252* (2013.01)

(56) References Cited

OTHER PUBLICATIONS

Partial European Search Report for Application No. EP21207802.6, mailed on Apr. 29, 2022, 15 Pages.

\* cited by examiner

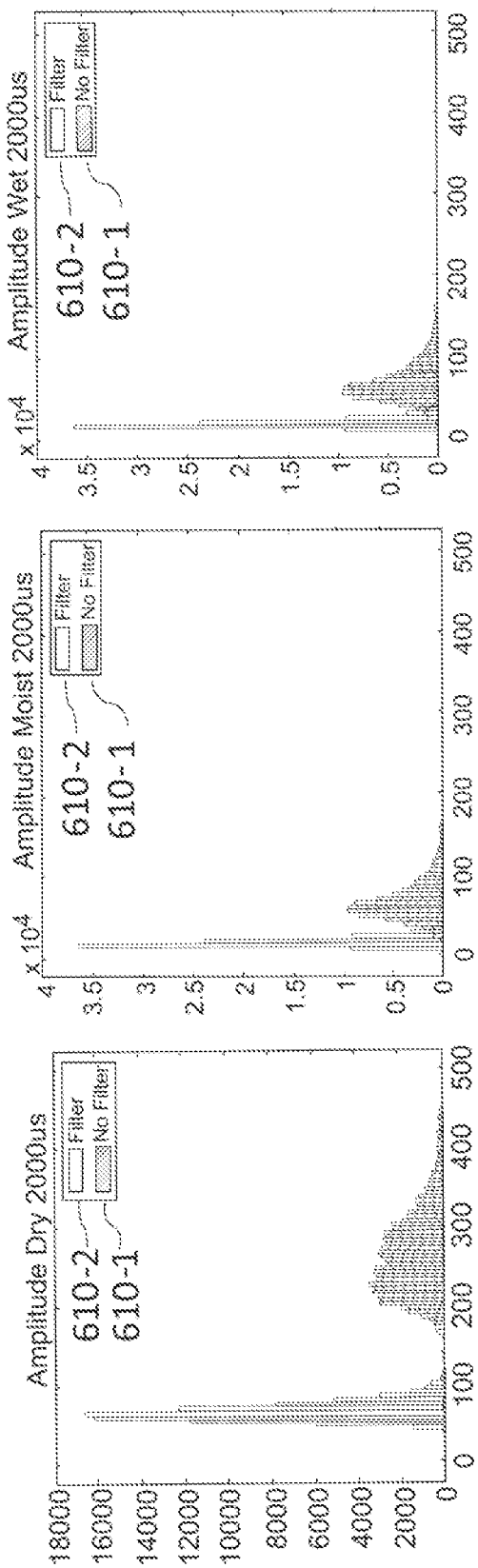

APPARATUS FOR DETECTING A SPECULAR SURFACE IN A SCENE AND METHOD FOR CONTROLLING AN APPARATUS FOR DETECTING A SPECULAR SURFACE IN A SCENE

CROSS REFERENCE TO RELATED APPLICATION

This application claims priority to European Patent Application No. 21207802 filed on Nov. 11, 2021, the content of which is incorporated by reference herein in its entirety.

TECHNICAL FIELD

The present disclosure relates to detection of a specular surface. Examples relate to an apparatus for detecting a specular surface in a scene and a method for controlling an apparatus for detecting a specular surface in a scene.

BACKGROUND

Detecting a specular surface in a scene may be useful for lots of applications, e.g., for detection of water on roadways in automotive applications or sweat detection as feature of fitness devices. However, a conventional imaging system capturing an image of the scene is not capable of differentiating between specular and non-specular surfaces in the scene. Hence, there may be a demand for improved imaging.

SUMMARY

Example implementations described herein may relate to one or more imaging systems and/or one or more methods capable of differentiating between specular and non-specular surfaces in a scene.

An example relates to an apparatus for detecting a specular surface in a scene. The apparatus includes an illumination device configured to emit polarized light towards the scene. The apparatus further includes an imaging system configured to capture a first image of the scene based on light emanating from the scene. The light emanating from the scene includes one or more reflection of the emitted polarized light. The imaging system is further configured to capture a second image of the scene based on filtered light. The apparatus further includes a polarization filter configured to generate the filtered light by filtering the light emanating from the scene. The apparatus further includes processing circuitry configured to determine presence of the specular surface in the scene based on a comparison of the first image and the second image.

Another example relates to a method for operating an apparatus for detecting a specular surface in a scene. The apparatus for detecting the specular surface includes an illumination device, an imaging system, a polarization filter, and processing circuitry. The method includes emitting polarized light towards the scene and capturing a first image of the scene based on light emanating from the scene. The light emanating from the scene includes one or more reflection of the emitted polarized light. The method further includes generating filtered light by filtering the light emanating from the scene through the polarization filter and capturing a second image of the scene based on the filtered light. The method further includes determining presence of the specular surface in the scene based on a comparison of the first image and the second image.

BRIEF DESCRIPTION OF THE DRAWINGS

Some examples of apparatuses and/or methods will be described in the following by way of example only, and with reference to the accompanying figures, in which

FIGS. 6a-6c illustrate example light intensity histograms;

DETAILED DESCRIPTION

Figure 1:
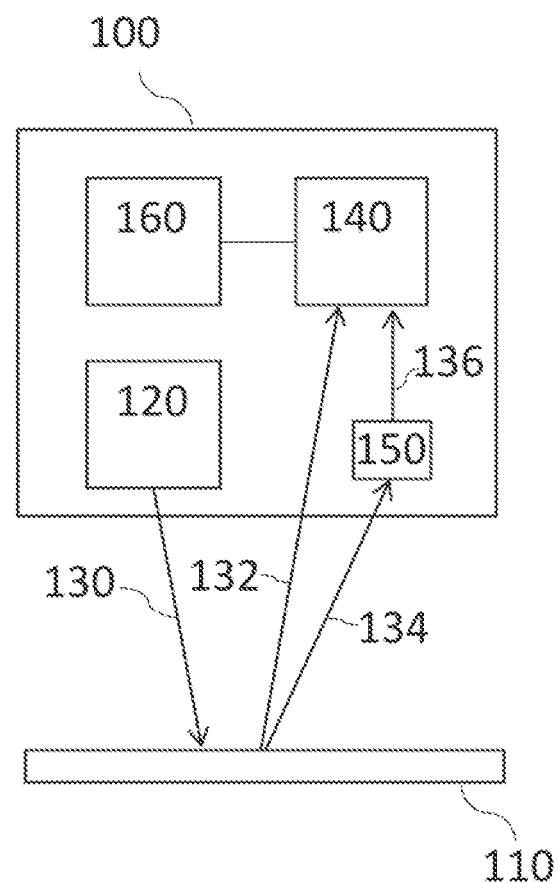
FIG. 1 illustrates an example of an apparatus for detecting a specular surface in a scene.

Some examples are now described in more detail with reference to the enclosed figures. However, other possible examples are not limited to the features of these implementations described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, e.g., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates an example of an apparatus 100 for detecting a specular surface in a scene 110. The specular surface is to be understood as a light-reflecting surface, e.g., light impinging on the specular surface is at least partly reflected from the specular surface and a resulting reflection retains its parallelism according to the law of reflection. The specular surface may exhibit a specific roughness or unevenness to be considered specular. For instance, the specular surface may have an average roughness that is limited to a specific maximum value relative to a wavelength of impinging light to be specular for the light. The specular surface may be, e.g., a surface of a liquid or a mirroring, even surface of a solid. For instance, the specular surface may be a surface of water, glass, or metal.

The apparatus 100 comprises an illumination device 120 configured to emit polarized light 130 towards the scene 110. The illumination device 120 may comprise one or more light source such as one or more Light-Emitting Diode (LED) and/or one or more laser diode (e.g., one or more Vertical-Cavity Surface-Emitting Laser, VCSEL) for radiating the polarized light 130. The illumination device 120 may emit polarized light of any wavelength, e.g., infrared light, visible light, or mixtures thereof.

The polarized light 130 is light oscillating (mainly) in a specific geometrical orientation, e.g., light exhibiting a specific polarization. The polarization refers to a direction of an electric field or magnetic field of the polarized light 130. The emitted polarized light 130 may exhibit a linear (planar), circular, or elliptic polarization. In case of the linear polarization, the electric/magnetic field of the polarized light 130 oscillates at least mainly in a specific direction perpendicular to a direction of propagation of the polarized light 130. The linear polarization may be described as an angle between the specific direction and a reference direction.

In case of the circular or elliptical polarization, the electric/magnetic field of the polarized light 130 rotates at a (mainly) constant rate in a plane perpendicular to the direction of propagation. During propagation of the polarized light 130, a tip of a field vector of the electric/magnetic field describes a circle or an ellipse on the plane, respectively. The circular or elliptical polarization may be described based on a sense of rotation of the electric/magnetic field. If the electric/magnetic field rotates in a right-hand sense (clockwise) with respect to the direction of propagation, the polarized light 130 exhibits a right-handed circular polarization, while if the electric/magnetic field rotates in a left-hand sense (anti-clockwise), the polarized light 130 exhibits a left circular polarization.

The polarization of the polarized light 130 may be predefined or configurable due to a type, an operation mode, or an arrangement of the illumination device 120. For instance, a polarization filter of the illumination device 120 may be placed in front of a light source of the illumination device 120. The light source may radiate unpolarized light at least partly towards the polarization filter. The polarization filter may attenuate light not exhibiting a predefined (linear/circular/elliptic) polarization depending on a type of the polarization filter. An arrangement of the polarization filter regarding a reference plane may influence the angle or rotation sense of the polarization of the polarized light 130 regarding the reference plane. Thus, the polarization filter may be configured with regard to the type and arrangement of the polarization filter such that the polarization filter allows the polarized light 130 to pass.

The polarization filter may then direct the polarized light 130 to the scene 110. The type or arrangement of the polarization filter may be changed or adjusted during an operation of the illumination device 120, e.g., resulting into different operation modes of the illumination device 120. Then, the polarization of the polarized light 130 may be configurable by switching between the different operation modes.

In some examples, the illumination device 120 may additionally comprise optical elements such as a waveplate (retarder) or an optical lens. In some examples, the illumination device 120 may comprise a first light source configured to emit the polarized light 130 towards the scene 110 a second light source configured to emit unpolarized light towards the scene 110. For instance, the first light source and the second light source may illuminate the scene 110 independently, one with polarized and the other one with unpolarized light.

It is to be noted, that the scene 110 shown in FIG. 1 is meant for illustration. In other examples, the scene 110 may be of a different shape or arranged differently regarding the apparatus 100 than shown in FIG. 1. The scene 110 may comprise objects of which one may have a specular surface.

Referring back to FIG. 1, the apparatus 100 further comprises an imaging system 140 configured to capture a first image of the scene 110 based on light emanating from the scene 110. The imaging system 140 may be any optical instrument capable of capturing (digital) images of the scene 110. The imaging system 140 may comprise various components such as e.g., optics (e.g., one or more lenses) and electronic circuitry. In particular, the electronic circuitry may comprise one or more image sensor comprising each at least one photo-sensitive element or pixel (e.g., comprising a Photonic Mixer Device, PMD, or a Charge-Coupled Device, CCD). For example, each image sensor may comprise a plurality of photo-sensitive elements or pixels. For instance, the imaging system 140 may comprise one or more camera such as a digital camera or a time-of-flight camera. The imaging system 140 may be mainly sensitive to light of a wavelength of the polarized light 130.

The light emanating from the scene 110 comprises one or more reflection 132, 134 of the emitted polarized light 130. The reflections 132, 134 may be a directed or diffuse reflection (e.g., remission) of the emitted polarized light 130. The reflections 132, 134 result from the emitted polarized light 130 being reflected or backscattered from objects in the scene 110. Characteristics of the reflections 132, 134 such as polarization or light intensity may depend on physical or chemical properties of the objects, e.g., roughness of a surface of the objects, transparency, translucence of the object, or absorption of light by the objects. The characteristics of the reflections 132, 134 may be specific for a material of the objects.

In case a specular surface is present in the scene 110 on which the emitted polarized light 130 impinges, a resulting reflection (e.g., reflection 132, 134) may exhibit a polarization corresponding to (but not necessarily matching) a polarization of the emitted polarized light 130. For instance, if the emitted polarized light exhibits a right-handed circular polarization (as provided by the illumination device 120) and impinges on the specular surface, then, the resulting reflection exhibits a left-handed circular polarization, thus, exhibiting a mirrored sense of rotation relative to the emitted polarized light 130. The reversal of the sense of rotation is due to a reverse direction of propagation in comparison to the emitted polarized light 130. Similarly, if the emitted polarized light exhibits a left-handed circular polarization (as provided by the illumination device 120) and impinges on the specular surface, then, the resulting reflection exhibits a right-handed circular polarization. In other examples, the emitted polarized light 130 may exhibit a predefined linear polarization. If the emitted polarized light 130 with the predefined linear polarization impinges on the specular surface, then, the resulting reflection exhibits the predefined linear polarization, e.g., linear polarizations may be maintained after reflection.

By contrast, when the emitted polarized light 130 impinges on a non-specular surface, portions of the emitted polarized light 130 may be scattered (diffusely reflected). A resulting reflection (e.g., reflection 132, 134) may have an undefined or mixed polarization.

By way of illustration, in FIG. 1, the polarized light 130 and the reflections 132, 134 are indicated by light rays along example optical paths between the apparatus 100 and the scene 110. In other examples, the polarized light 130 may comprise more light rays than shown in FIG. 1. The light rays may run along different optical paths between the apparatus 100 and the scene 110 than shown in FIG. 1. In other examples, the light emanating from the scene 110 may comprise less or more reflections than the ones shown in FIG. 1. In general, the light emanating from the scene 110 may comprise n≥1 reflections.

The imaging system 140 is further configured to capture a second image of the scene 110 based on filtered light 136. The apparatus 100 further comprises a polarization filter 150 configured to generate the filtered light 136 by filtering the light emanating from the scene 110. The polarization filter 150 may filter the one or more reflection 132, 134 of the emitted polarized light 130. A data acquisition time for capturing the first image and the second image of the scene 110 may be synchronized with an emission time of the polarized light 130.

The polarization filter 150 is an optical filter or polarizer that lets light exhibiting a specific polarization (the filtered light 136) pass through while attenuating light of other polarizations. For instance, the polarization filter 150 may filter light of undefined or mixed polarization into light exhibiting a well-defined (predefined) polarization. The polarization filter 150 may be, for instance, of a dichroic, reflective, birefringent, scattering, or diffractive type. In case of a dichroic type, the polarization filter 150 may be a macromolecular foil plastically stretched into one direction. The direction of stretching may decide which polarization light exhibits that passes the polarization filter. Alternatively, the polarization filter 150 may be a wire grid polarizer or a polarizing prism, for instance.

The polarization filter 150 may direct the filtered light 136 to the imaging system 140 for capturing the second image. For instance, the polarization filter 150 may be placed in front of the imaging system 140—at least from time to time.

Referring back to FIG. 1, the apparatus 100 further comprises processing circuitry 160 configured to determine presence of the specular surface in the scene 110 based on a comparison of the first image and the second image. Example approaches of how the processing circuitry 160 may determine the presence of the specular surface in the scene 110 based on the comparison is explained with reference to FIG. 5*a* and FIG. 5*b*.

The processing circuitry 160 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuitry 160 may optionally be coupled to, e.g., read only memory (ROM) for storing software, random access memory (RAM) and/or non-volatile memory. The processing circuitry 160 is communicatively coupled to the imaging system 140 for transferring the first image and the second image from the imaging system 140 to the processing circuitry 160.

The first image and the second image may relate to a digital image, e.g., a bitmapped or vector image. The first image and the second image may comprise pixels representing a discrete quantity of a property (such as light intensity, color) of light being captured by the imaging system 140. The first image and the second image may comprise reflection data of a respective view of the scene 110. A view represented by the first image may at least partly correspond to a view represented by the second image. The first image and the second image may be captured at the same time or at different times but at quick succession.

In order to infer presence of the specular surface from the comparison of the first image and the second image, the imaging system 140 captures the first image and the second image with different sensitivities to specular reflections of the emitted polarized light 130.

For instance, if specular reflections occur, they may be captured in the first image but be mainly omitted in the second image. The different sensitivities may be realized by, e.g., capturing the first image without the polarization filter 150 and the second image with the polarization filter 150. The polarization filter 150 may be selected and adjusted in accordance with a polarization of the emitted polarized light 130. Furthermore, the apparatus 100 may be configured to pursue a specific filtering strategy.

For instance, a first filtering strategy may specify that the polarization filter 150 is intended to block specular reflections of the emitted polarized light 130. Thus, the imaging system 140 may be intended to "omit" the specular reflections for capturing the second image, e.g., the second image is intended to not represent the specular reflections. For the first filter strategy, the polarization filter 150 may be selected or adjusted such that the polarization filter 150 attenuates (blocks) light exhibiting a polarization equal to the polarization of specular reflections of the emitted polarized light 130. The polarization filter 150 may let pass light exhibiting a polarization differing from the polarization of the specular reflections. For instance, the emitted polarized light 130 may exhibit one of a right-handed circular polarization and a left-handed circular polarization. Pursuing the first filtering strategy, the polarization filter 150 may be configured to filter the other one of the right-handed circular polarization and the left-handed circular polarization out of the light emanating from the scene 110. In other examples, the emitted polarized light 130 may exhibit a predefined linear polarization. Then, the polarization filter 150 may be configured to filter the light emanating from the scene 110 by attenuating light exhibiting the predefined linear polarization. In other words, the polarization filter 150 may be a circular polarization filter, or a linear polarization filter which filters light with a complementary polarization relative to the emitted polarized light 130 such that direct reflections of the emitted polarized light 130 are blocked.

A second filtering strategy may specify that the polarization filter 150 is intended to block non-specular reflections of the emitted polarized light 130. Thus, the second image may be intended to represent specular reflections of the emitted polarized light 130 but to neglect at least partly the non-specular reflections. For instance, the emitted polarized light 130 may exhibit a circular polarization. Pursuing the second filtering strategy, the polarization filter 150 may be configured to filter the circular polarization out of the light emanating from the scene 110. In other examples, the emitted polarized light 130 may exhibit a predefined linear polarization. Then, the polarization filter 150 may be configured to filter the light emanating from the scene 110 by attenuating light not exhibiting the predefined linear polarization.

Optionally, the imaging system 140 may be further configured to capture the first image of the scene based on light filtered differently than the filtered light 136, e.g., filtered based on a different filtering strategy. The imaging system 140 may comprise, e.g., a second polarization filter to generate the differently filtered light. For instance, the imaging system 140 may capture the first image based on the first filtering strategy and the second image based on the second filtering strategy.

In conclusion, a difference between the first image and the second image may indicate presence of specular reflection. For instance, the apparatus 100 may detect water or other objects with specular surfaces in a scene. For this purpose, the apparatus 100 may combine conventional imaging and polarization imaging.

In some examples, the apparatus 100 may be applied for determining presence of water on a roadway. For instance, the processing circuitry 160 may be further configured to determine reflection characteristics of the specular surface based on a comparison of the first image and the second image. If presence of a specular surface is determined, the processing circuitry 160 may classify a material forming the specular surface based on the reflection characteristics. The processing circuitry 160 may be configured to classify the material as, e.g., water, snow, oil, metal, or glass. The processing circuitry 160 may be further configured to determine whether the specular surface is located on a roadway. If it is determined that the specular surface is located on the roadway, the processing circuitry 160 may estimate a friction coefficient of a vehicle on the roadway based on the classified material.

Furthermore, the apparatus 100 may distinguish water levels based on a comparison of polarized and non-polarized images of a scene. The apparatus 100 may determine the presence of water on the roadway to predict a friction coefficient of vehicles on the roadway for driving assistance applications or traffic management, for instance. Similarly, the apparatus 100 may be used to distinguish snow from rain droplets when monitoring driving conditions of the roadway.

In other examples, the apparatus 100 may be applied for detecting sweat on a skin of a human. For instance, the processing circuitry 160 may be further configured to, if presence of the specular surface is determined, determine whether the specular surface is located on the skin of the human. If it is determined that the specular surface is located on the skin of the human, the processing circuitry 160 may classify the specular surface as sweat. Sweat detection may be an additional feature for smartphones, HVAC (heating, ventilation, and air conditioning) devices, or fitness devices.

Figure 2:
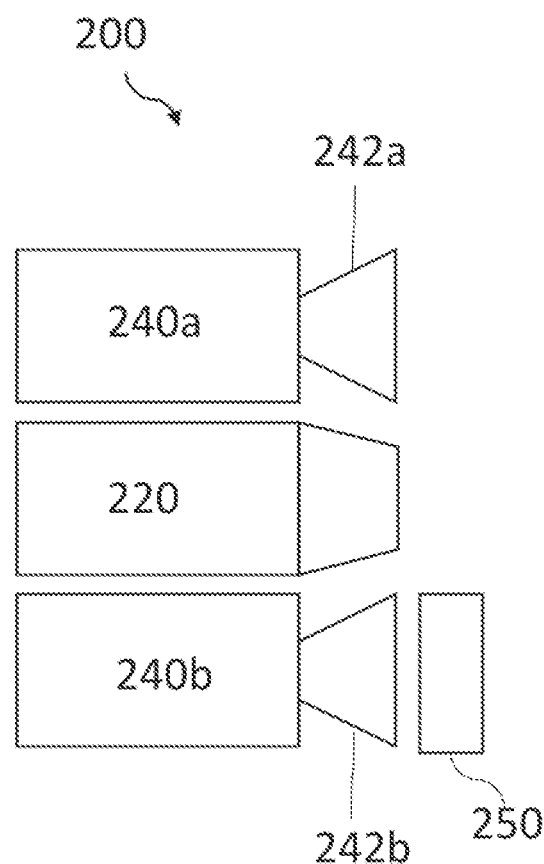
FIG. 2 illustrates another example of an apparatus for detecting a specular surface in a scene.

FIG. 2 illustrates another example of an apparatus 200 for detecting a specular surface in a scene (not shown). The scene may be located right of the apparatus 200 (in FIG. 2). The apparatus 200 comprises an illumination device 220 configured to emit polarized light towards the scene. The illumination device 220 is oriented to the right (in FIG. 2) to emit the polarized light towards the scene.

The apparatus 200 further comprises an imaging system comprising a first camera 240*a*. The first camera 240*a* is placed above the illumination device 220 (in FIG. 2). The first camera 240*a* is configured to capture a first image of the scene. The first camera 240*a* may be any type of camera, e.g., a conventional camera or a time-of-flight camera.

An aperture 242*a* is placed in front of the first camera 240*a*. The aperture 242*a* may be an optical device with an opening to limit light emanating from the scene to a bundle of light rays that focus on an image plane of the first camera 240*a*. The opening may determine a first field of view, e.g., a field of view of the first camera 240*a*. In other words, the first camera 240*a* is configured to capture the first image of the scene by capturing light emanating from the scene in the first field of view. The light emanating from the scene comprises one or more reflection of the emitted polarized light.

The imaging system further comprises a second camera 240*b*. The second camera 240*b* is placed below the illumination device 220 (in FIG. 2). The second camera 240*b* is configured to capture a second image of the scene. The second camera 240*b* may be any type of camera, e.g., a conventional camera or a time-of-flight camera.

An aperture 242*b* is placed in front of the second camera 240*b*. The aperture 242*b* may determine a second field of view, e.g., a field of view of the second camera 240*b*. The second camera 240*b* is configured to capture the second image of the scene by capturing light emanating from the scene in the second field of view. The second camera 240*b* is configured to capture the second image based on filtered light.

The first camera 240*a* and the second camera 240*b* are oriented to the right (in FIG. 2) such that the first camera 240*a* and the second camera 240*b* capture the first image and the second image, respectively, based on light emanating from right of the apparatus 200. In other words, the illumination device 220, the first camera 240*a* and the second camera 240*b* are aligned to the scene right of the apparatus 200. Thus, the first camera 240*a* and the second camera 240*b* may mainly capture direct reflections of the emitted polarized light. The first field of view and the second field of view may at least partly overlap, e.g., the first camera 240*a* and the second camera 240*b* may be at least partly oriented to a common section of the scene.

The apparatus 200 further comprises a polarization filter 250 which is placed in front of the second camera 240*b*, more specifically, in front of the aperture 242*b* of the second camera. The polarization filter 250 is configured to generate the filtered light by filtering the light emanating from the scene. The polarization filter 250 may block specular reflections occurring in the scene. A difference (comparison) between the first image and the second image may indicate presence of the specular reflections.

The apparatus 200 may represent a simple setup for detecting specular surfaces: two imagers, the first camera 240*a* and the second camera 240*b*, one without a polarization filter and one with a polarization filter (250), looking at nearly the same field of view. The illumination device 220 is configured to illuminate the scene with polarized light. A first image is captured without a polarization filter, a second image is captured with a polarization filter.

The setup of the apparatus 200 may enable a simultaneous capture of the first image and the second image. This may be beneficial for applications in dynamic environments where the apparatus 200 moves relative to the scene, such as automotive applications.

In other examples, an arrangement of the first camera 240*a*, the second camera 240*b*, and the illumination device may be different than the one shown in FIG. 2. For instance, a position of the first camera 240*a* and a position of the second camera 240*b* may be swapped.

Figure 3:
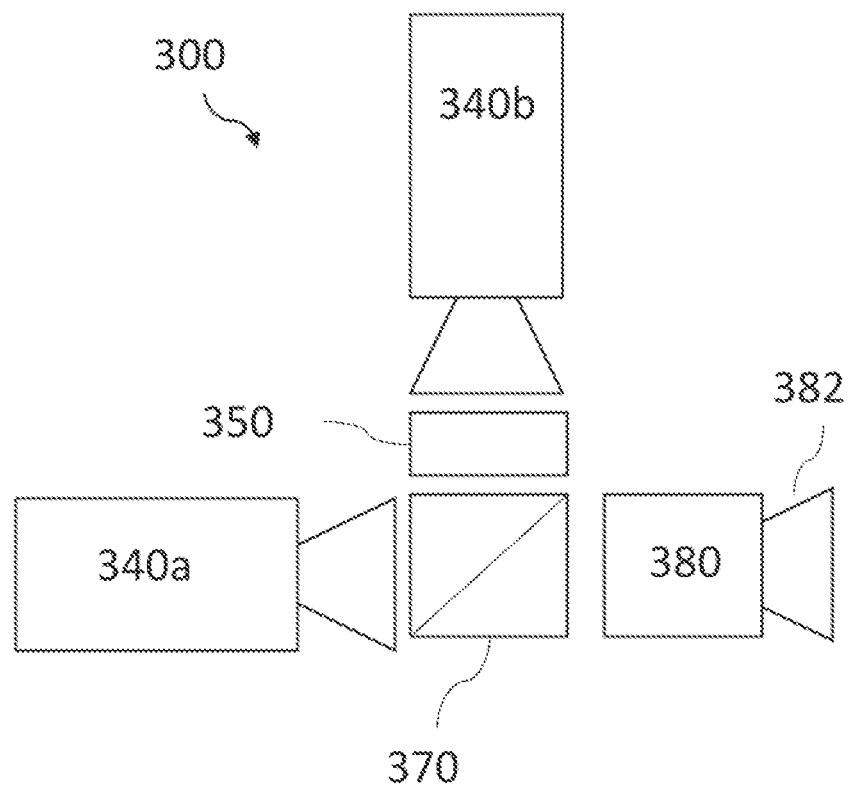
FIG. 3 illustrates another example of an apparatus for detecting a specular surface in a scene.

FIG. 3 illustrates another example of an apparatus 300 for detecting a specular surface in a scene (not shown). The scene may be located right of the apparatus 300 (in FIG. 3).

An illumination device (not shown in FIG. 3) of the apparatus 300 is configured to emit polarized light towards the scene.

The apparatus 300 comprises a first camera 340a rotated 90 degrees relative to a second camera 340b. A polarization filter 350 is placed in front of the aperture of the second camera 340b. The polarization filter 350 generates filtered light by filtering the second portion of light and directs the filtered light to the second camera 340b.

The apparatus 300 further comprises a beam splitter 370. The first camera 340a and the second camera 340b are oriented (with their apertures) towards the beam splitter 370. The beam splitter 370 is configured to direct a first portion of the light emanating from the scene to the first camera 340a and direct a second portion of the light emanating from the scene to the polarization filter 350. In other words, the beam splitter 370 directs an image of the scene to both cameras, the first camera 340a and the second camera 340b. The beam splitter 370 may be an optical device for splitting a beam of the light emanating from the scene into two beams. The beam splitter 370 may, e.g., comprise a half-silvered mirror or two triangular glass prisms glued together at their base.

The first camera 340a is configured to capture a first image of the scene based on the first portion of the light emanating from the scene. The light emanating from the scene comprises one or more reflection of the emitted polarized light. The second camera 340b is configured to capture a second image of the scene based on the filtered light. The first camera 340a and the second camera 340b may be any type of camera, e.g., a conventional camera or a time-of-flight camera.

The apparatus 300 further comprises a focusing lens 380 and an aperture 382 placed in front of the focusing lens. The focusing lens 380 is placed in front of the beam splitter 370 such that it focuses light emanating from the scene onto the beam splitter. The aperture 382 is oriented towards the scene. The aperture 382 may limit the light entering the focusing lens 380 and, therefore, determine a field of view of the first camera 340a and the second camera 340b.

In other examples, the apparatus 300 may comprise other optical elements than the focusing lens 380 and the aperture 382 shown in FIG. 3. The first camera 340a and the second camera 340b may be arranged otherwise than shown in FIG. 3, for example, their positions may be swapped.

The apparatus 300 may further comprise processing circuitry configured to determine presence of the specular surface based on a comparison between the first image and the second image.

A setup of the apparatus 300 shown in FIG. 3 may be advantageous since a field of view of the first camera 340a may correspond to a field of view of the second camera 340b, e.g., the first image and the second image may show the same view of the scene. This may be helpful since only sections of the scene that are represented in both images may be taken into consideration for a comparison of the first image and the second image for detecting the specular surface in the scene. Furthermore, in the setup shown in FIG. 3, the first camera 340a and the second camera 340b may share common optical elements, such as the lens 380. Therefore, the setup may be cost-efficient.

Figure 4A:
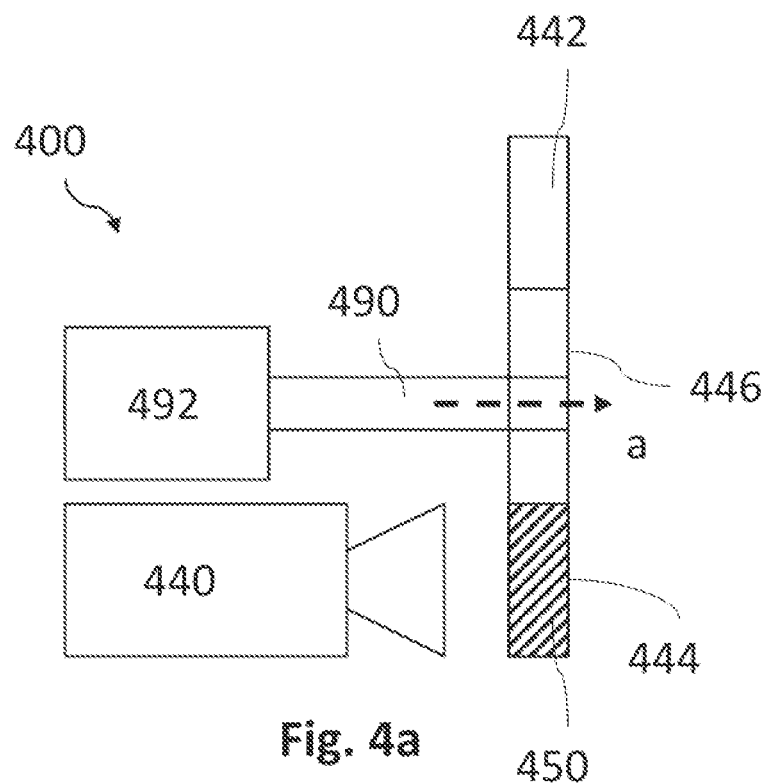
FIGS. 4a and 4b illustrate a side view and a front view of another example of an apparatus 100 for detecting a specular surface in a scene.
Figure 4B:
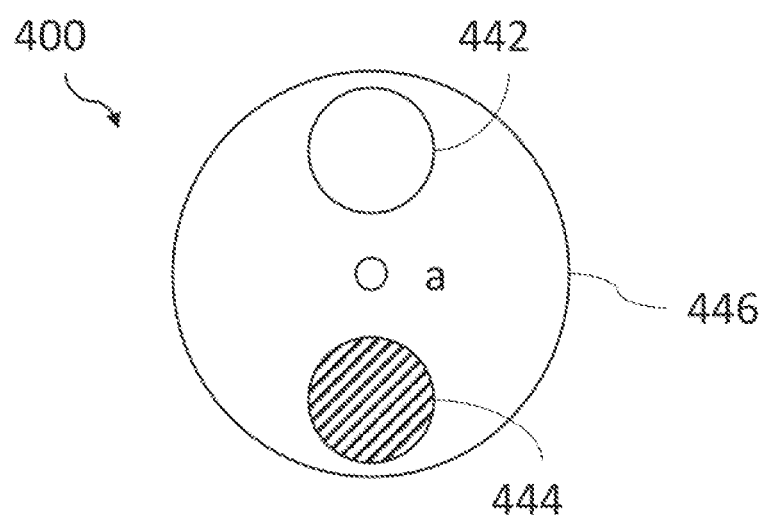

FIG. 4a and FIG. 4b illustrate a side view and a front view of another example of an apparatus 400 for detecting a specular surface in a scene. The scene may be located right of the apparatus 400 in FIG. 4a. The apparatus 400 comprises an illumination device (not shown) configured to emit polarized light towards the scene.

The apparatus 400 comprises a camera 440 oriented (with its aperture) to the scene. The camera 440 is configured to capture a first image and a second image of the scene. The apparatus 400 may switch between a first configuration for capturing the first image and a second configuration for capturing the second image.

For the first configuration which is shown in FIG. 4a, a polarization filter 450 is placed in front of the camera 440, e.g., between the aperture of the camera 440 and the scene. While the first configuration is set, the camera 440 captures the second image of the scene based on light emanating from the scene and being filtered by the polarization filter 450. Thus, the polarization filter 450 is placed in front of the camera 440 while capturing the second image of the scene. The light emanating from the scene comprises one or more reflection of the emitted polarized light. In some examples, the polarization filter 450 may be configured to attenuate specular reflections of the emitted polarized light such that the camera 440 captures mainly non-specular reflections of the emitted polarized light and/or unpolarized light emanating from the scene in the first configuration.

For the second configuration, the polarization filter 450 is placed offset to the front of the camera 440 while capturing the first image of the scene. Consequently, the camera 440 captures the first image based on light emanating from the scene and not being filtered by the polarization filter 450. Instead, a conventional aperture 442 is placed in front of the camera 440.

To change between the first configuration and the second configuration, the apparatus 400 comprises a mechanical assembly configured to move the polarization filter 450 with respect to the camera 440. The mechanical assembly comprises a first aperture (the conventional aperture 442) and a second aperture 444 mechanically coupled to a rotatable shaft 490. The polarization filter 450 is integrated into the second aperture 444. The first aperture 442 and the second aperture 444 are attached to the rotatable shaft 490 via a disc 446. The first aperture 442 and the second aperture 444 are integrated on opposite sides of the disc 446. A motor 492 may rotate the shaft 490 relative to an axis a which points towards the scene. A rotation of the shaft 490 may cause the disc 446 to rotate relative to the axis a. Rotating the disc 446 may cause the polarization filter 450 to shift its position relative to the camera 440.

A setup of the apparatus 400 shown in FIG. 4a and FIG. 4b may be advantageous since only one camera is needed for capturing the first image as well as the second image. Hence, an alignment of several cameras in order to capture a common section of the scene in the first image and in the second image may be unnecessary.

When changing to the first configuration, the motor 492 may be controlled to rotate the disc 446 to a position where the polarization filter 450 is placed in front of the camera 440. The camera 440 may be synchronized with a controller of the motor 492 such that the camera 440 captures the second image when the polarization filter 450 is placed in front of the camera 440. Similarly, when changing to the second configuration, the motor 492 may be controlled to rotate the disc 446 to a position where the first aperture 442 is placed in front of the camera 440.

In other examples, the mechanical assembly of the apparatus 400 may be arranged differently than shown in FIG. 4a and FIG. 4b. For instance, the mechanical assembly may move the first aperture 442 and the second aperture 444 linearly along an axis parallel to the scene. The disc 446 may be of a different shape than shown in FIG. 4b, e.g., elongated, or rectangular.

Figure 5A:
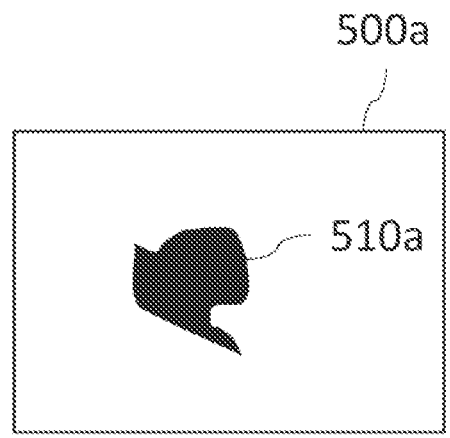
FIGS. 5a and 5b illustrate an example first image and an example second image of a scene.
Figure 5B:
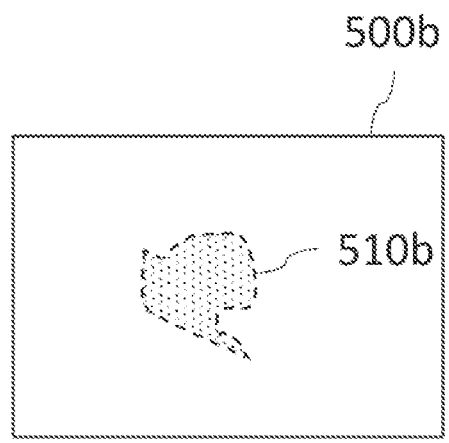

FIG. 5a and FIG. 5b illustrate an example first image 500a (FIG. 5a) and an example second image 500b (FIG. 5b). The first image 500a and the second image 500b are to be understood as a visualization of a first image and a second image captured by an imaging system of an apparatus for detecting a specular surface in a scene, e.g., apparatus 100, 200, 300, or 400, e.g., the first image 500a and the second image 500b show a simplified data structure of image data generated by the apparatus. Pixels of the image data are shown as a two-dimensional structure in FIG. 5a and FIG. 5b. The pixels may be arranged in the two-dimensional structure according to coordinates associated with the pixels.

The first image 500a and the second image 500b are captured at the same time or nearly at the same time (e.g., within a few milliseconds of time difference) by the imaging system. The first image 500a and the second image 500b represent at least partly a common section of the scene, e.g., for capturing the first image 500a the imaging system may have a field of view at least partly overlapping a field of view of the imaging system for capturing the second image 500b. In case a view recorded by the first image 500a is shifted relative to a view recorded by the second image 500b, the shift between the two views may be taken into consideration for comparing the first image 500a and the second image 500b.

In the example of FIG. 5 and FIG. 5b, the first image 500a and the second image 500b are captured based on a filtering strategy corresponding to the first filtering strategy described above, e.g., the first image 500a is captured by the imaging system without filtering a polarization of light emanating from the scene, wherein the light emanating from the scene comprises one or more reflection of polarized light emitted by the apparatus. The second image 500b is captured by the imaging system based on filtered light. The filtered light is generated by a polarization filter of the apparatus by attenuating specular reflections of the polarized light. In other words, the first image 500a is captured without the polarization filter and the second image 500b is captured with polarization filter. In other examples of the present disclosure, the first image 500a and second image 500b may be captured based on a different filtering strategy.

The first image 500a comprises a structure 510a exhibiting a certain light intensity, represented by a dark area in FIG. 5a. The structure 510a may correspond to a reflection of the polarized light at a specular surface in the scene. The second image 500b comprises a structure 510b of less light intensity than the structure 510a, indicated by a dotted area in FIG. 5b. Pixel coordinates of the structure 510a may correspond to pixel coordinates of the structure 510b, e.g., the structure 510a and the structure 510b may represent the same section of the scene. The structure 510b may correspond to a reflection of unpolarized light at the specular surface in the scene or to a reflection of the polarized light and/or the unpolarized light at a non-specular surface beneath the specular surface (in case a material forming the specular surface is transparent). A decrease of light intensity of the structure 510b relative to the structure 510a may be due to the polarization filter that decreases an amount of light impinging on a sensitive area of the imaging system.

A processing circuitry of the apparatus may compare the first image 500a and the second image 500b for determining presence of a specular surface in the scene. The processing circuitry may determine the presence of the specular surface in the scene by determining a difference between a light intensity distribution in the first image 510a and a light intensity distribution in the second image 510b. In the example of FIG. 5a and FIG. 5b, the processing circuitry may compare a light intensity of the structure 510a and a light intensity of the structure 510b. If a difference between the light intensity of the structure 510a and the light intensity of the structure 510b exceeds a certain threshold, the processing circuitry may generate data indicating that a specular surface is detected.

The processing circuitry may, e.g., compare reflection characteristics derived from the first image 500a and reflection characteristics derived from the second image 500b. For instance, if water is present in the scene, a reflection of the polarized light on a surface of the water may cause different reflection characteristics recorded in the first image 500a and the second image 500b.

In some examples, the processing circuitry may generate a light intensity histogram based on the first image 500a and the second image 500b. The processing circuitry may sort light intensity values of the first image 500a and the second image 500b by size resulting in a first light intensity distribution of the first image 500a and a second light intensity distribution of the second image 500b.

FIG. 6a, FIG. 6b and FIG. 6c illustrate example light intensity histograms 600a, 600b and 600c for a dry scene (600a), a moist scene (600b) and a wet scene (600c). The light intensity histograms 600a, 600b and 600c show a number of occurrences (pixels) on the vertical axis over a light intensity value (pixel value) on the horizontal axis, e.g., they illustrate how many pixels of an image of the (dry, moist, or wet) scene represent a certain light intensity value or range of light intensity values.

The light intensity histograms 600a, 600b and 600c comprise a first light intensity distribution 610-1 and a second light intensity distribution 610-2. The first light intensity distribution 610-1 refers to a first image of the (dry, moist, or wet) scene captured without a polarization filter, such as the first image 500a, and the second light intensity distribution 610-2 refers to a second image of the scene captured with a polarization filter, such as the second image 500b. The polarization filter may attenuate specular reflections of polarized light.

The dry scene may show objects with a mainly non-specular surface. The moist scene may show at least some objects with a specular surface (e.g., water). The wet scene may show objects with a larger specular surface compared to the moist scene.

In all three light intensity histograms 600a, 600b and 600c, the first light intensity distribution 610-1 results in a broader curve compared to the second light intensity distribution 610-2, e.g., a standard deviation of the first light intensity distribution 610-1 is higher. Secondly, the curve of the first light intensity distribution 610-1 results in a more flattened curve compared to the second light intensity distribution 610-2, e.g., a peak of the curve of the first light intensity distribution 610-1 is lower. Thirdly, the curve of the first light intensity distribution 610-1 is shifted to a higher light intensity range compared to the second light intensity distribution 610-2, e.g., a mean value of the first light intensity distribution 610-1 is higher. This may be due to the light intensity values corresponding to a specular reflection of the polarized light being mainly dropped (filtered out) in the second image. In some examples, the deviations in the first light intensity distribution 610-1 compared to the second light intensity distribution 610-2 may indicate that a specular surface in the scene is transparent and, therefore, the second image may comprise light intensity values corresponding to a non-specular surface beneath the specular surface of the scene which may lead to more occurrences of the light intensity values corresponding to a non-specular surface in the second image.

A shift of the curve of the first light intensity distribution 610-1 along the horizontal axis relative to a curve of the second light intensity distribution 610-2 is bigger in the light intensity histogram 600a than in the light intensity histograms 600b and 600c. Besides, the curve of the first light intensity distribution 610-1 is more pointed in the light intensity histograms 600b and 600c than in the light intensity histogram 600a. This may be due to a larger total area of specular surfaces in the moist scene (600b) and the wet scene (600c) compared to the dry scene (600c).

There may be mathematical relation between the total area of specular surface in the scene and a difference between a mean value, a peak and/or a standard deviation of the first light intensity distribution 610-1 and the second light intensity distribution 610-2. Thus, a processing circuitry may use the mathematical relation to infer from a comparison of the first light intensity distribution 610-1 (first image) and the second light intensity distribution 610-2 (second image) if a specular surface is present in the scene (and, optionally, how big the total area of the specular surface is). For instance, if the difference falls below a certain threshold, the processing circuitry may determine that a specular surface is present in the scene. Additionally, the processing circuitry may infer from a comparison of the first image and the second image if the specular surface belongs to a transparent object.

Referring back to FIG. 5a and FIG. 5b, alternatively to the above-mentioned techniques, a processing circuitry may be configured to determine the presence of the specular surface in the scene by determining a difference between at least one of a sum, a standard deviation, a mean value of light intensities of the first image 500a and the second image 500b. For instance, the processing circuitry may calculate a sum of light intensities (pixel values) of the first image 500a and a sum of light intensities (pixel values) of the second image 500b. As the polarization filter applied for capturing the second image 500b removes specular reflections, a corresponding light intensity value (direct reflection value) may only partly be recorded in the second image 500b. Thus, the processing circuitry may determine a difference in the sum of light intensities of the first image 500a and the sum of light intensities of the second image 500b. If the difference exceeds a certain threshold, the processing circuitry may generate data indicating a specular surface is detected.

In some examples, the processing circuitry may be configured to convolute the first image 500a and the second image 500b. For instance, the light intensities of the first image 500a and the light intensities of the second image 500b may be convoluted with a filter-kernel. Convoluting may be performed by adding light intensities of each pixel to light intensities of neighboring pixels, weighted based on the filter-kernel. The filter-kernel is a matrix of real numbers used for weighting pixel data. The processing circuitry may be further configured to apply edge detection to the convoluted first image 500a and the convoluted second image 500b. Edge detection is a mathematical method for detecting edges or curves in a digital image by identifying pixels at which light intensities change sharply (or has discontinuities) relative to neighboring pixels. The processing circuitry may be further configured to determine the presence of the specular surface based on comparing at least one detected edge of the first image 500a and at least one detected edge of the second image 500b. For instance, the processing circuitry may detect sharp edges at the structure 510a in the first image 500a and weaker or no edges at the structure 510b in the second image 500b. The processing circuitry may determine whether a specular surface is present based on a difference in intensity, in shape, or in location of the detected edges between the first image 500a and the second image 500b.

In other examples, the first image 500a and the second image 500b may be captured by at least one time-of-flight camera of the imaging system. In this case, the processing circuitry may be further configured to, if presence of the specular surface is determined, determine a distance between the specular surface and a non-specular surface beneath the specular surface based on the comparison of the first image 500a and the second image 500b. The time-of-flight camera may provide measurement data indicating a time difference between an emission of the polarized light and a capturing time when a reflection of the polarized light impinges on a sensitive area of the time-of-flight camera. A distance between the imaging system and objects in the scene which caused the reflection may be inferred from the measurement data. For instance, if a transparent material with a specular surface such as water is present in the scene, the first image 500a may represent measurement data generated based on specular reflections at a specular surface of the water. The second image 500b may represent measurement data generated based on non-specular reflections of light passing through the water. The non-specular reflection may be caused by a reflection at a non-specular surface beneath the water, such as a ground where the water is located on. The processing circuit may determine a distance between the imaging system and the specular surface of the water and a distance between the imaging system and the non-specular surface based on the measurement data. Hence, the processing circuit may infer a water level or depth of water by subtracting the distances derived from the first image 500a and from the second image 500b.

In some examples, the processing circuitry may be configured to determine reflection characteristics of the specular surface based on the comparison of the first image 500a and the second image 500b. For instance, the processing circuitry may determine the reflection characteristics by deriving a transparency or a spectral reflectance of a material forming the specular surface based on the comparison. For deriving the transparency or the spectral reflectance, the processing circuitry may compare light intensities and wavelengths of the first image 500a (without polarization filter) and light intensities and wavelengths, recorded by the second image 500b (with polarization filter). If the processing circuitry determines presence of the specular surface, the processing circuitry may further be configured to classify the material forming the specular surface based on the reflection characteristics. Since reflection characteristics may be material-specific, the processing circuitry may compare the reflection characteristics with one or more predefined reflection characteristics being related to one or more candidate materials. The processing circuitry may classify the material as, e.g., water, snow, oil, metal, or glass. The processing circuitry may alternatively classify the material by applying an object recognition algorithm (computer vision) to the first image 500a and the second image 500b.

In some examples, the processing circuitry may be further configured to, if presence of the specular surface is determined, determine whether the specular surface is located on a roadway. For instance, the processing circuitry may determine, based on the first image 500a and second image 500b, if a reflection characteristic indicated by pixels representing a surrounding of the detected specular surface matches (known) reflection characteristics of the roadway. The processing circuitry may further be configured to, if it is determined that the specular surface is located on the roadway, estimate a friction coefficient of a vehicle on the roadway based on a material forming the specular surface. For instance, the processing circuitry may have classified the material as water. Since the friction coefficient is material-specific, the processing circuitry may derive the friction coefficient from the classification of the material, e.g., by extracting the friction coefficient of water from a look-up-table. In case the specular surface is formed by a transparent material such as water, the processing circuitry may additionally determine a depth of the transparent material (a water level) as described above. Then, the processing circuitry may determine the friction coefficient based on the classified material and on the depth of the classified material.

It is to be noted that the first image 500a and the second image 500b shown in FIG. 5a and FIG. 5b are meant as an example. In other examples, the first image 500a and the second image 500b may show a different scene without specular surfaces or with more specular surfaces than shown in FIG. 5a and FIG. 5b. In other examples, the first image 500a and the second image 500b may show objects in the scene, they may comprise any information about light emanating from the scene, e.g., measurement data of a time-of-flight camera, a light intensity, or a wavelength (color) of the light. A processing circuitry may use any information captured by the first image 500a and the second image 500b to infer if a specular surface is present in the scene.

Figure 7:
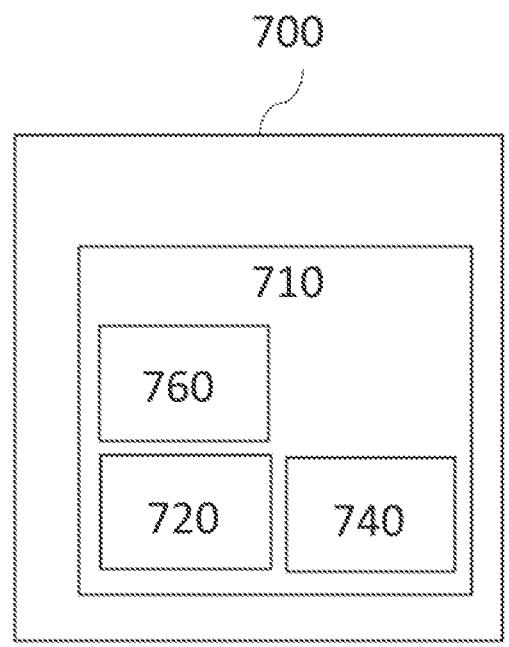
FIG. 7 illustrates an example of a vehicle comprising an apparatus for detecting a specular surface in a scene.

FIG. 7 illustrates an example of a vehicle 700 comprising an apparatus 710 for detecting a specular surface in a scene. For instance, the scene may be a roadway on which the vehicle 700 may drive. The apparatus 710 may be, e.g., the apparatus 100, 200, 300, or 400. The vehicle may be any apparatus for transporting people or cargo. For instance, the vehicle may comprise wheels driven by an engine (and optionally a powertrain system). In particular, the vehicle may be an automobile, a train, a truck, a motorcycle, or a tractor.

The apparatus 710 comprises an illumination device 720 configured to emit polarized light towards the scene. In some examples, the illumination device 720 may be integrated into a headlight of the vehicle 700. In this case, the illumination device 720 may comprise a first light source configured to emit the polarized light and a second light source configured to emit unpolarized light. The second light source may be a conventional headlight for illuminating a surrounding of the vehicle 700.

The apparatus 710 further comprises an imaging system 740. For instance, the imaging system 740 may comprise one or more camera (imager) which are implemented in a front of the vehicle 700. The first light-source may emit light which is polarized and modulated. The camera may be sensitive to the polarized and modulated light. The camera may generate a first image without a polarization filter and based on reflections of the polarized and modulated light and a second image with a polarization filter.

A processing circuitry 760 of the apparatus 710 may be configured to determine presence of the specular surface based on a comparison of the first image and the second image. The processing circuitry may be further configured to, if presence of the specular surface is determined, to determine whether the specular surface is located on a roadway. And, if it is determined that the specular surface is located on the roadway, estimate a friction coefficient of the vehicle 700, especially of wheels of the vehicle, on the roadway based on a classified material forming the specular surface.

The estimated friction coefficient may be input to an advanced driver assistance system (ADAS) of the vehicle 700. The ADAS may estimate a brake path based on a velocity of the vehicle 700 and the estimated friction coefficient. If the estimated brake path exceeds a certain threshold, the ADAS may output a warning signal or automatically reduce the velocity.

Figure 8:
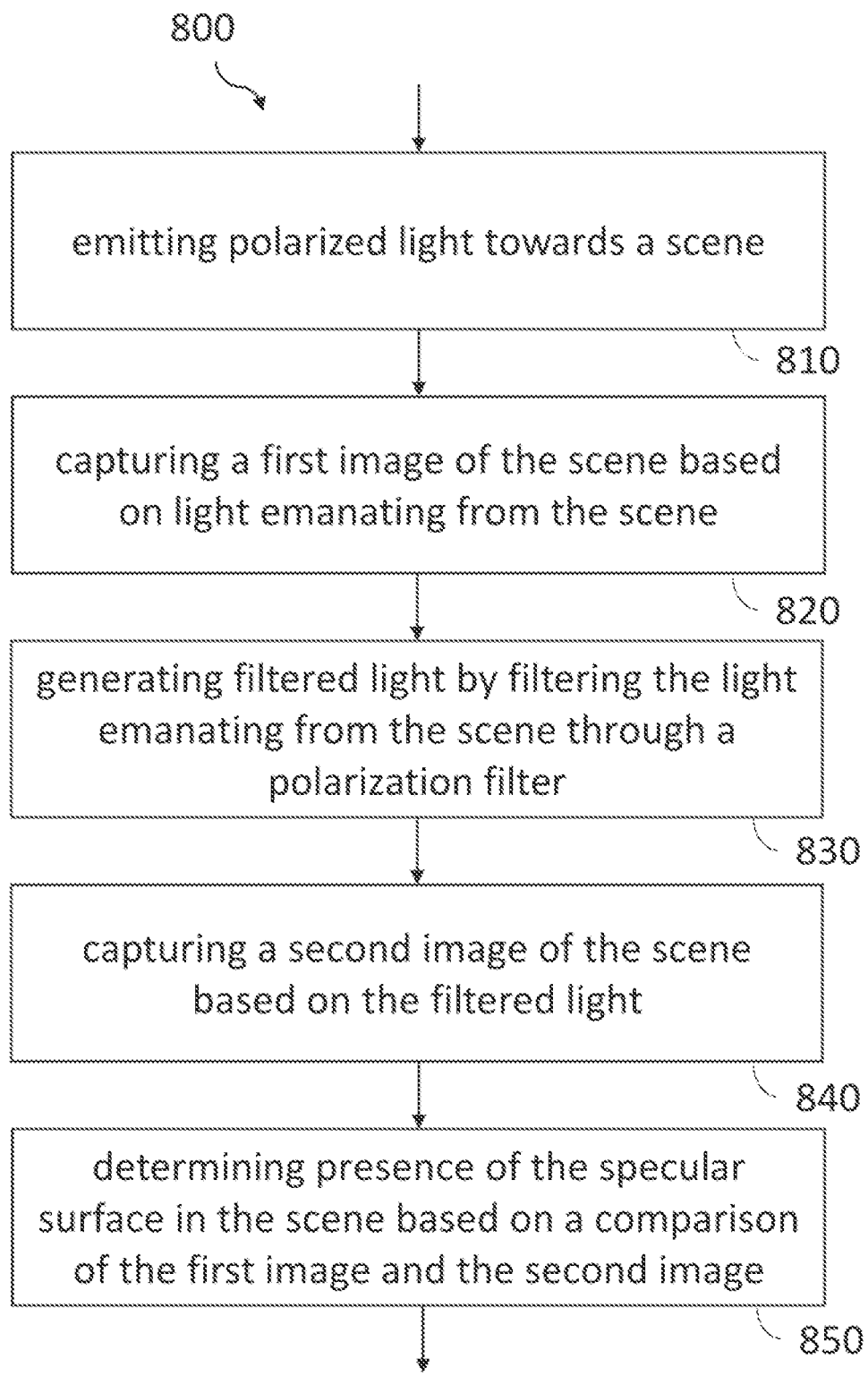
FIG. 8 illustrates a flowchart of an example of a method for operating an apparatus for detecting a specular surface in a scene.

FIG. 8 illustrates a flowchart of an example of a method 800 for operating an apparatus for detecting a specular surface in a scene. The apparatus comprises an illumination device, an imaging system, a polarization filter, and processing circuitry, such as the apparatus 100, 200, 300, or 400.

The method 800 comprises emitting 810 polarized light towards the scene, capturing 820 a first image of the scene based on light emanating from the scene. The light emanating from the scene comprises one or more reflection of the emitted polarized light. The method 800 further comprises generating 830 filtered light by filtering the light emanating from the scene through the polarization filter, capturing 840 a second image of the scene based on the filtered light and determining 850 presence of the specular surface in the scene based on a comparison of the first image and the second image.

More details and aspects of the method 800 are explained in connection with the proposed technique or one or more examples described above, e.g., with reference to FIG. 1. The method 800 may comprise one or more additional optional features corresponding to one or more aspects of the proposed technique, or one or more examples described above.

The method 800 may allow a detection of specular surfaces in the scene which may be in particular useful for water detection in automotive applications or for fitness devices with sweat detection.

A basic idea of the implementation to combine conventional imaging and polarization imaging may be applicable in other application fields besides for detecting a specular surface in a scene. For instance, techniques described above, e.g., with reference to FIG. 1, may be used for determining reflection characteristics of objects in the scene. This may be useful for material classification since reflection characteristics are material specific. Examples for material classification are described hereinafter with reference to FIG. 9 and FIG. 10.

Figure 9:
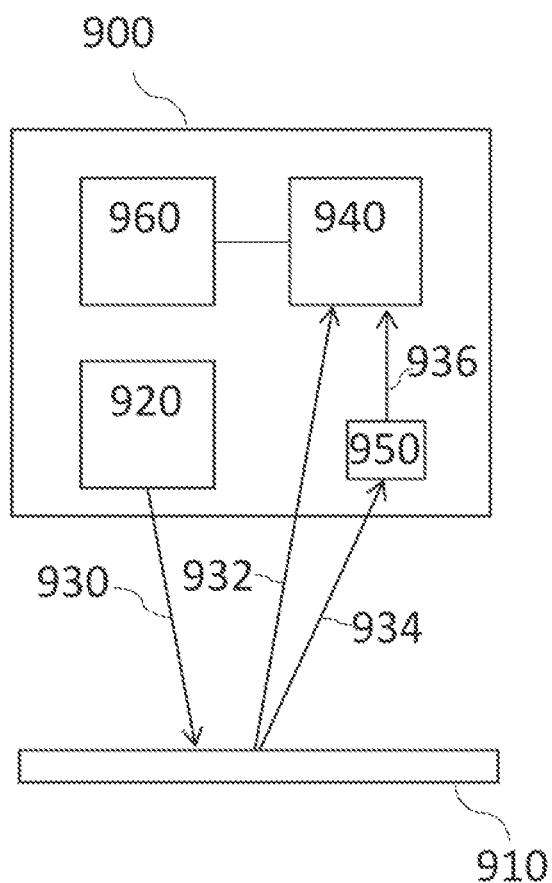
FIG. 9 illustrates an example of an apparatus for classifying a material in a scene.

FIG. 9 illustrates an example of an apparatus 900 for classifying a material in a scene 910. The apparatus 900 comprises an illumination device 920 configured to emit polarized light 930 towards the scene 910. A portion of the emitted polarized light 930 may impinge on a surface of the material and be reflected off of the surface.

The apparatus 900 further comprises an imaging system 940 configured to capture a first image of the scene 910 based on light emanating from the scene 910. The light emanating from the scene 910 comprises one or more reflection of the emitted polarized light 930, e.g., reflection 934 and reflection 932. The reflection may be caused by parts of the emitted polarized light being reflected off of the material.

The imaging system 940 is further configured to capture a second image of the scene based on filtered light 936. The apparatus 900 further comprises a polarization filter 950 configured to generate the filtered light by filtering the light emanating from the scene 910.

The illumination device 920, the imaging system 940 and the polarization filter 950 may be setup and configured analogously to the illumination devices, imaging systems and polarization filters described above with respect to the apparatuses 100, 200, 300, and 400. Hence, it is referred to the above description for the further structural details of the illumination device 920, the imaging system 940 and the polarization filter 950.

The apparatus 900 further comprises processing circuitry 960 configured to determine reflection characteristics of the material based on a comparison of the first image and the second image and classify the material based on the reflection characteristics. The processing circuitry 960 may be configured to determine the reflection characteristics of the material by determining a difference between at least one of a sum, a standard deviation, a mean value of light intensities of the first image and the second image. An example approach of how the processing circuitry 960 may determine the reflection characteristics is explained with reference to FIG. 5*a* and FIG. 5*b*.

The processing circuitry 960 may be configured to classify the material by comparing the determined reflection characteristics of the material with one or more predefined reflection characteristic being related to one or more candidate material. For instance, the processing circuitry 960 may access a database of candidate materials which registers the candidate materials with respective reflection characteristics. The processing circuitry 960 may compare entries of the database with the determined reflection characteristics. If one of the entries lies within a predefined tolerance range around the determined reflection characteristics, the processing circuitry 960 may select a corresponding candidate material as match for the material.

The apparatus 900 may be used for material classification, e.g., in industrial or medical applications. The apparatus 900 may be advantageous since it classifies materials optically without mechanically or chemically affecting the materials.

In some examples, the processing circuitry 960 may be configured to determine whether the determined reflection characteristics correspond to predefined reflection characteristics of human skin. For instance, the processing circuitry 960 may access a data storage storing a value range of reflection characteristics which are typical for human skin. If it is determined that the determined reflection characteristics correspond to the predefined reflection characteristics of human skin, the processing circuitry 960 may be configured to classify the material as human skin. In other words, if the determined reflection characteristics lie within the value range, the processing circuitry 960 may declare the material as human skin.

On the one hand, if the material is classified as human skin, the apparatus 900 may be configured to perform a face recognition process. On the other hand, if the material is not classified as human skin, the apparatus 900 may be configured to output data indicating that the material in the scene is not part of a human.

In the latter case, the apparatus 900 may measure how deep light enters into the human skin in the illuminated scene before being reflected towards the imaging system 940. Since human skin exhibits predefined reflection characteristics, they may be compared with reflection characteristics derived from a comparison of the (normal intensity) first image and the (filtered) second image. The first image and the second image may be placed in an amplitude/light intensity histogram to compare the resulting reflection characteristics with the predefined reflection characteristics of human skin.

The apparatus 900, as described in the latter, may be used for anti-spoofing in face recognition processes. This may be useful for smartphones or other devices with a user login based on face recognition (face-ID). The apparatus 900 may prevent an unlocking of the concerned device if an unauthorized user tries to deceive the face recognition by wearing a mask of an authorized user.

Figure 10:
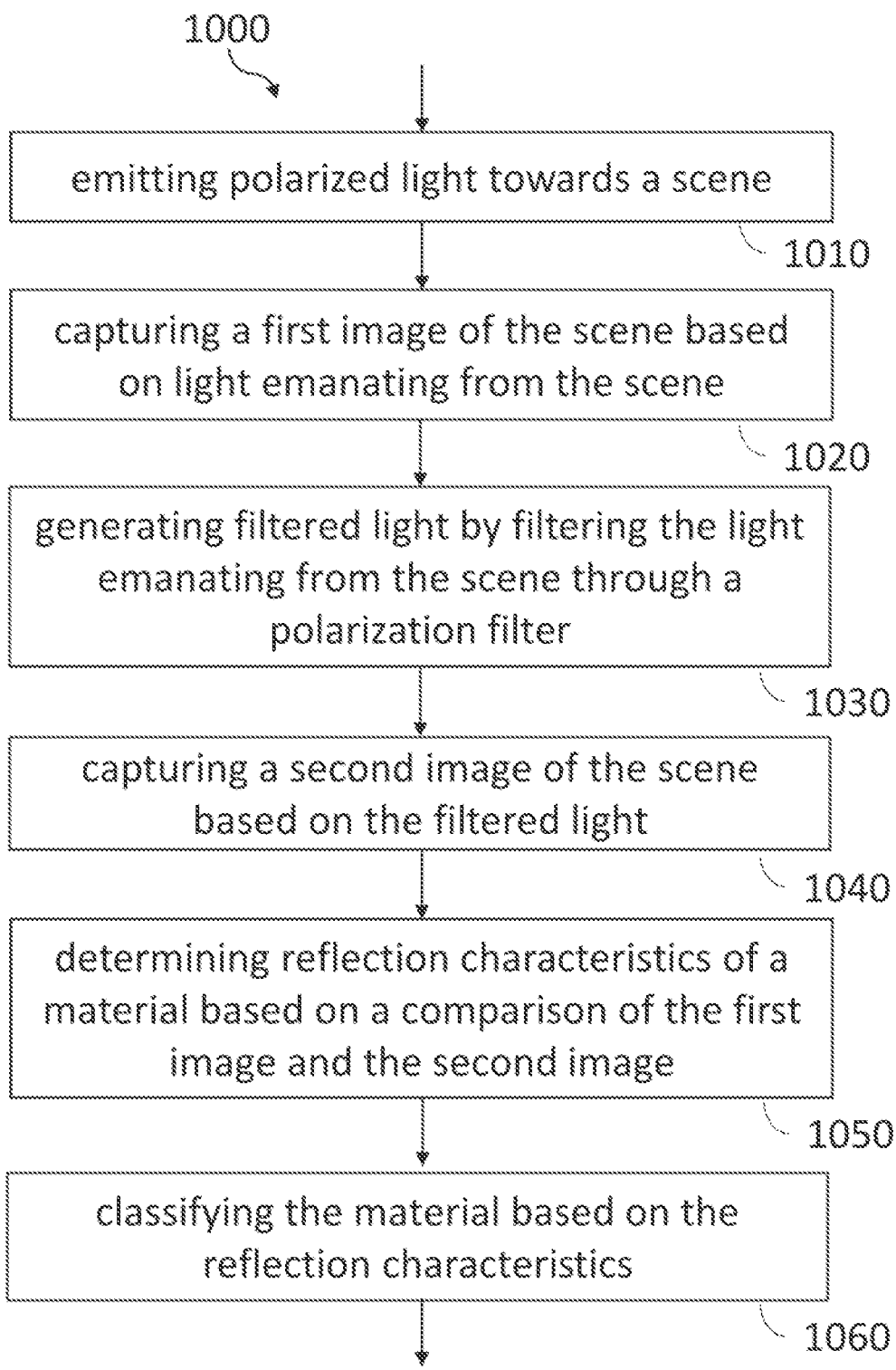
FIG. 10 illustrates a flowchart of an example of a method for operating an apparatus for classifying a material in a scene.

FIG. 10 illustrates a flowchart of an example of a method 1000 for operating an apparatus for classifying a material in a scene, such as the apparatus 900. The apparatus comprises an illumination device, an imaging system, a polarization filter, and processing circuitry.

The method 1000 comprises emitting 1010 polarized light towards the scene and capturing 1020 a first image of the scene based on light emanating from the scene. The light emanating from the scene comprises one or more reflection of the emitted polarized light. The method 1000 further comprises generating 1030 filtered light by filtering the light emanating from the scene through the polarization filter and capturing 1040 a second image of the scene based on the filtered light. The method 1000 further comprises determining 1050 reflection characteristics of the material based on a comparison of the first image and the second image and classifying 1060 the material based on the reflection characteristics.

More details and aspects of the method 1000 are explained in connection with the proposed technique or one or more examples described above, e.g., with reference to FIG. 9. The method 1000 may comprise one or more additional optional features corresponding to one or more aspects of the proposed technique, or one or more examples described above.

The method 1000 may allow a classification of a material in the scene which may be in particular useful for anti-spoofing.

ASPECTS

The following aspects pertain to further implementations:

Implementation (1) is an apparatus for detecting a specular surface in a scene comprising an illumination device configured to emit polarized light towards the scene, an imaging system configured to capture a first image of the scene based on light emanating from the scene wherein the light emanating from the scene comprises one or more reflection of the emitted polarized light and wherein the imaging system is further configured to capture a second image of the scene based on filtered light. The apparatus comprises a polarization filter configured to generate the filtered light by filtering the light emanating from the scene and processing circuitry configured to determine presence of the specular surface in the scene based on a comparison of the first image and the second image.

Implementation (2) is the apparatus of implementation (1) wherein the emitted polarized light exhibits one of a right-handed circular polarization and a left-handed circular polarization, and wherein the polarization filter is configured to filter the other one of the right-handed circular polarization and the left-handed circular polarization out of the light emanating from the scene.

Implementation (3) is the apparatus of implementation (1) wherein the emitted polarized light exhibits a predefined linear polarization, and wherein the polarization filter is configured to filter the light emanating from the scene by attenuating light exhibiting the predefined linear polarization.

Implementation (4) is the apparatus of any one of implementations (1) to (3) wherein the imaging system comprises a first camera configured to capture the first image of the scene and a second camera configured to capture the second image of the scene wherein the polarization filter is placed in front of the second camera.

Implementation (5) is the apparatus of implementation (4) wherein the first camera is configured to capture the first image of the scene by capturing light emanating from the scene in a first field of view and wherein the second camera is configured to capture the second image of the scene by capturing light emanating from the scene in a second field of view and wherein the first field of view and the second field of view at least partly overlap.

Implementation (6) is the apparatus of implementation (4) or (5) wherein the imaging system further comprises a beam splitter configured to direct a first portion of the light emanating from the scene to the first camera and direct a second portion of the light emanating from the scene to the second camera.

Implementation (7) is the apparatus of any one of implementations (4) to (6) wherein at least one of the first camera and the second camera is a time-of-flight camera.

Implementation (8) is the apparatus of any one of implementations (1) to (3) wherein the imaging system comprises a camera configured to capture the first image and the second image of the scene and a mechanical assembly configured to move the polarization filter with respect to the camera wherein the polarization filter is placed in front of the camera while capturing the second image of the scene and wherein the polarization filter is placed offset to the front of the camera while capturing the first image of the scene.

Implementation (9) is the apparatus of implementation (8), wherein the mechanical assembly comprises a first aperture and a second aperture mechanically coupled to a rotatable shaft, and wherein the polarization filter is integrated into the second aperture.

Implementation (10) is the apparatus of implementation (8) or (9) wherein the camera is a time-of-flight camera.

Implementation (11) is the apparatus of implementation (7) or (10) wherein the processing circuitry is further configured to, if presence of the specular surface is determined, determine a distance between the specular surface and a non-specular surface beneath the specular surface based on the comparison of the first image and the second image.

Implementation (12) is the apparatus of any one of implementations (1) to (11) wherein the illumination device comprises a first light source configured to emit the polarized light towards the scene and a second light source configured to emit unpolarized light towards the scene.

Implementation (13) is the apparatus of any one of implementations (1) to (12) wherein the processing circuitry is configured to determine the presence of the specular surface in the scene by determining a difference between a light intensity distribution in the first image and a light intensity distribution in the second image.

Implementation (14) is the apparatus of any one of implementations (1) to (13) wherein the processing circuitry is configured to determine the presence of the specular surface in the scene by determining a difference between at least one of a sum, a standard deviation, a mean value of light intensities of the first image and the second image.

Implementation (15) is the apparatus of any one of implementations (1) to (14) wherein the processing circuitry is configured to convolute the first image and the second image, apply edge detection to the convoluted first image and the convoluted second image and determine the presence of the specular surface based on comparing at least one detected edge of the first image and at least one detected edge of the second image.

Implementation (16) is the apparatus of any one of implementations (1) to (15) wherein the processing circuitry is further configured to determine reflection characteristics of the specular surface based on a comparison of the first image and the second image and, if presence of the specular surface is determined, classify a material forming the specular surface based on the reflection characteristics.

Implementation (17) is the apparatus of implementation (16) wherein the processing circuitry is further configured to classify the material as at least one of water, snow, oil, metal, glass.

Implementation (18) is the apparatus of implementation (16) or (17) wherein the processing circuitry is further configured to, if presence of the specular surface is determined, determine whether the specular surface is located on a roadway and, if it is determined that the specular surface is located on the roadway, estimate a friction coefficient of a vehicle on the roadway based on the classified material.

Implementation (19) is the apparatus of any one of implementations (1) to (15) wherein the processing circuitry is further configured to, if presence of the specular surface is determined, determine whether the specular surface is located on skin of a human and, if it is determined that the specular surface is located on the skin of the human, classify the specular surface as sweat.

Implementation (20) is a vehicle comprising the apparatus for detecting a specular surface in a scene according to any one of implementations (1) to (17) wherein the processing circuitry is further configured to, if presence of the specular surface is determined, determine whether the specular surface is located on a roadway and, if it is determined that the specular surface is located on the roadway, estimate a friction coefficient of the vehicle on the roadway based on a classified material forming the specular surface.

Implementation (21) is the vehicle of implementation (20) wherein the illumination device is integrated into a headlight of the vehicle.

Implementation (22) is a method for operating an apparatus for detecting a specular surface in a scene wherein the apparatus for detecting the specular surface comprises an illumination device, an imaging system, a polarization filter, and processing circuitry. The method comprises emitting polarized light towards the scene, capturing a first image of the scene based on light emanating from the scene wherein the light emanating from the scene comprises one or more reflection of the emitted polarized light. The method further comprises generating filtered light by filtering the light emanating from the scene through the polarization filter, capturing a second image of the scene based on the filtered light and determining presence of the specular surface in the scene based on a comparison of the first image and the second image.

Implementation (23) is an apparatus for classifying a material in a scene comprising an illumination device configured to emit polarized light towards the scene, an imaging system configured to capture a first image of the scene based on light emanating from the scene wherein the light emanating from the scene comprises one or more reflection of the emitted polarized light and wherein the imaging system is further configured to capture a second image of the scene based on filtered light. The apparatus further comprises a polarization filter configured to generate the filtered light by filtering the light emanating from the scene; and processing circuitry configured to determine reflection characteristics of the material based on a comparison of the first image and the second image and classify the material based on the reflection characteristics.

Implementation (24) is the apparatus of implementation (23) wherein the emitted polarized light exhibits one of a right-handed circular polarization and a left-handed circular polarization and wherein the polarization filter is configured to filter the other one of the right-handed circular polarization and the left-handed circular polarization out of the light emanating from the scene.

Implementation (25) is the apparatus of implementation (23) wherein the emitted polarized light exhibits a predefined linear polarization and wherein the polarization filter is configured to filter the light emanating from the scene by attenuating light exhibiting the predefined linear polarization.

Implementation (26) is the apparatus of any one of implementations (23) to (25) wherein the imaging system comprises a first camera configured to capture the first image of the scene and a second camera configured to capture the second image of the scene wherein the polarization filter is placed in front of the second camera.

Implementation (27) is the apparatus of any one of implementations (23) to (26) wherein the first camera is configured to capture the first image of the scene by capturing light emanating from the scene in a first field of view and wherein the second camera is configured to capture the second image of the scene by capturing light emanating from the scene in a second field of view and wherein the first field of view and the second field of view at least partly overlap.

Implementation (28) is the apparatus of implementation (26) or (27) wherein the imaging system further comprises a beam splitter configured to direct a first portion of the light emanating from the scene to the first camera and direct a second portion of the light emanating from the scene to the second camera.

Implementation (29) is the apparatus of any one of implementations (23) to (25) wherein the imaging system comprises a camera configured to capture the first image and the second image of the scene and a mechanical assembly configured to move the polarization filter with respect to the camera wherein the polarization filter is placed in front of the camera while capturing the second image of the scene and wherein the polarization filter is placed offset to the front of the camera while capturing the first image of the scene.

Implementation (30) is the apparatus of implementation (29) wherein the mechanical assembly comprises a first aperture and a second aperture mechanically coupled to a rotatable shaft and wherein the polarization filter is integrated into the second aperture.

Implementation (31) is the apparatus of any one of implementations (23) to (30) wherein the illumination device comprises a first light source configured to emit the polarized light towards the scene and a second light source configured to emit unpolarized light towards the scene.

Implementation (32) is the apparatus of any one of implementations (23) to (31) wherein the processing circuitry is configured to determine the reflection characteristics of the material by determining a difference between a light intensity distribution in the first image and a light intensity distribution in the second image.

Implementation (33) is the apparatus of any one of implementations (23) to (32) wherein the processing circuitry is configured to determine the reflection characteristics of the material by determining a difference between at least one of a sum, a standard deviation, a mean value of light intensities of the first image and the second image.

Implementation (34) is the apparatus of any one of implementations (23) to (33) wherein the processing circuitry is configured to classify the material by comparing the determined reflection characteristics of the material with one or more predefined reflection characteristic, the one or more predefined reflection characteristic being related to one or more candidate material.

Implementation (35) is the apparatus of any one of implementations (23) to (34) wherein the processing circuitry is configured to determine whether the determined reflection characteristics correspond to predefined reflection characteristics of human skin and, if it is determined that the determined reflection characteristics correspond to the predefined reflection characteristics of human skin, classify the material as human skin.

Implementation (36) is the apparatus of implementation (35) wherein the apparatus is further configured to, if the material is classified as human skin, perform a face recognition process.

Implementation (37) is the apparatus of implementation (35) or (36) wherein, if the material is not classified as human skin, the apparatus is configured to output data indicating that the material in the scene is not part of a human.

Implementation (38) is a method for operating an apparatus for classifying a material in a scene, wherein the apparatus comprises an illumination device, an imaging system, a polarization filter, and processing circuitry. The method comprises emitting polarized light towards the scene and capturing a first image of the scene based on light emanating from the scene wherein the light emanating from the scene comprises one or more reflection of the emitted polarized light. The method further comprises generating filtered light by filtering the light emanating from the scene through the polarization filter, capturing a second image of the scene based on the filtered light, determining reflection characteristics of the material based on a comparison of the first image and the second image and classifying the material based on the reflection characteristics.

The aspects and features described in relation to a particular one of the previous aspects may also be combined with one or more of the further aspects to replace an identical or similar feature of that further aspect or to additionally introduce the features into the further aspect.

Aspects may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Aspects may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other aspects may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further aspects, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate aspect. It should also be noted that although in the claims a dependent claim refers to a particular combination with one or more other claims, other aspects may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus for detecting a specular surface in a scene, comprising:
   an illumination device configured to emit polarized light towards the scene;
   a polarization filter configured to generate filtered light by filtering one or more first reflections of the polarized light; and
   an imaging system configured to:
      capture a first image of the scene based on unfiltered light comprising one or more second reflections of the polarized light, and
   capture a second image of the scene based on the filtered light; and
   processing circuitry configured to determine a presence of the specular surface in the scene based on a comparison of the first image and the second image.

2. The apparatus of claim 1,
   wherein the polarized light exhibits a first one of a right-handed circular polarization or a left-handed circular polarization, and
   wherein the polarization filter is configured to filter a second one of the right-handed circular polarization or the left-handed circular polarization out of the one or more first reflections.

3. The apparatus of claim 1,
   wherein the polarized light exhibits a predefined linear polarization, and
   wherein the polarization filter is configured to filter the one or more first reflections by attenuating light exhibiting the predefined linear polarization.

4. The apparatus of claim 1,
   wherein the imaging system comprises:
      a first camera configured to capture the first image of the scene, and
      a second camera configured to capture the second image of the scene, and
   wherein the polarization filter is placed in front of the second camera.

5. The apparatus of claim 4,
   wherein the one or more first reflections are captured by the first camera from a first field of view and the one or more second reflections are captured by the second camera from a second field of view,
   wherein the first field of view and the second field of view at least partly overlap.

6. The apparatus of claim 4, wherein the imaging system further comprises a beam splitter configured to:
   direct a first portion of the unfiltered light and
   direct a second portion of the filtered light.

7. The apparatus of claim 1, wherein the imaging system comprises:
   a camera configured to capture the first image and the second image of the scene; and
   a mechanical assembly configured to move the polarization filter with respect to the camera,
   wherein the mechanical assembly is configured to:
      place the polarization filter in alignment with a front of the camera while capturing the second image of the scene, and
      offset the polarization filter from the front of the camera while capturing the first image of the scene.

8. The apparatus of claim 1,
   wherein the processing circuitry is further configured to, when the presence of the specular surface is determined, determine a distance between the specular surface and a non-specular surface arranged beneath the specular surface based on the comparison of the first image and the second image.

9. The apparatus of claim 1,
   wherein the processing circuitry is configured to determine the presence of the specular surface in the scene by determining a difference between a light intensity distribution in the first image and a light intensity distribution in the second image.

10. The apparatus of claim 1,
    wherein the processing circuitry is configured to determine the presence of the specular surface in the scene by determining a difference between at least one of a summed value, a standard deviation value, or a mean value of a light intensity of the first image and a light intensity of the second image.

11. The apparatus of claim 1,
    wherein the processing circuitry is further configured to:
       convolute the first image to generate a convoluted first image,
       convolute the second image to generate a convoluted second image,
       apply an edge detection to the convoluted first image to detect at least one detected edge of the convoluted first image,
       apply the edge detection to the convoluted second image to detect at least one detected edge of the convoluted second image, and determine the presence of the specular surface based on comparing the at least one detected edge of the convoluted first image and the at least one detected edge of the convoluted second image.

12. The apparatus of claim 1,
wherein the processing circuitry is further configured to:
determine reflection characteristics of the specular surface based on a comparison of the first image and the second image, and
when the presence of the specular surface is determined, classify a material forming the specular surface based on the reflection characteristics.

13. The apparatus of claim 12,
wherein the processing circuitry is further configured to:
when the presence of the specular surface is determined, determine that the specular surface is located on a roadway, and
when the specular surface is determined to be located on the roadway, estimate a friction coefficient of a vehicle on the roadway based on the material classified by the processing circuitry.

14. The apparatus of claim 1,
wherein the processing circuitry is further configured to:
when the presence of the specular surface is determined, determine that the specular surface is located on skin of a human, and
when the specular surface is determined to be located on the skin of the human, classify the specular surface as sweat.

15. A method for operating an apparatus that is configured to detect a specular surface in a scene, the method comprising:
emitting polarized light towards the scene;
capturing a first image of the scene based on unfiltered light comprising one or more first reflections of the polarized light;
generating filtered light by filtering one or more second reflections of the polarized light emanating from the scene through a polarization filter;
capturing a second image of the scene based on the filtered light; and
determining a presence of the specular surface in the scene based on a comparison of the first image and the second image.

16. The method of claim 15, wherein the one or more first reflections bypass the polarization filter.

17. The method of claim 15,
wherein the polarized light exhibits a first one of a right-handed circular polarization or a left-handed circular polarization, and
wherein the polarization filter is configured to filter a second one of the right-handed circular polarization or the left-handed circular polarization out of the one or more second reflections.

18. The method of claim 15,
wherein the polarized light exhibits a predefined linear polarization, and
wherein the polarization filter is configured to filter the one or more second reflections by attenuating light exhibiting the predefined linear polarization.

19. The method of claim 15,
wherein the first image of the scene is captured by a first camera, and
wherein the second image of the scene is captured by a second camera.

20. The method of claim 19,
wherein the one or more first reflections are captured by the first camera from a first field of view and the one or more second reflections are captured by the second camera from a second field of view, wherein the first field of view and the second field of view at least partly overlap.

* * * * *